Jan. 6, 1970    F. F. TONE ET AL    3,488,753
FILM IDENTIFICATION APPARATUS AND METHOD
Filed March 24, 1967

FREDERICK F. TONE
ROBERT F. DEPREZ
ROBERT I. EDELMAN
INVENTORS

BY

ATTORNEYS

United States Patent Office 3,488,753
Patented Jan. 6, 1970

3,488,753
FILM IDENTIFICATION APPARATUS AND METHOD
Frederick F. Tone, Robert F. Deprez, and Robert I. Edelman, Rochester, N.Y., assignors to Eastman Kodak Company, Rochester, N.Y., a corporation of New Jersey
Filed Mar. 24, 1967, Ser. No. 625,827
Int. Cl. G01n 21/00; H01j 37/22; H05g 1/60
U.S. Cl. 250—67                                        13 Claims

ABSTRACT OF THE DISCLOSURE

Apparatus and method for inserting an identification card and illuminating source through a light-tight slot of a closed cassette to lie adjacent to a film thereof. Once in position, the apparatus is activated to expose the film to create a latent image of the information on the card so that the film is unmistakably identified after X-ray exposure of the film in the cassette and developing of the film.

---

The present invention relates to a film identification system and more particularly to an apparatus and method for marking X-ray films within a light tight cassette for identification.

For some time it has been a problem to assure the identification of a particular medical case with a particular X-ray film after its development. In the days when very few radiographs were taken, and these were hand developed, simple code marks could be used with some assurance that the radiographs would not be mixed up. However, today many radiographs are taken in hospitals, and these radiographs are developed by automatic processors which receive a continual stream of film sheets at one end, and release the developed films several minutes later at the other end. With so many radiographs being processed within a closed machine during overlapping process periods, it becomes obvious that positive identification of each radiograph is a troublesome problem.

One approach to this identification problem has been to place lead metal letters as identifying indicia on the edge of an X-ray plate or cassette to be exposed during X-raying of the patient. Because of the expense and trouble using such letters, these indicia are usually limited to code only (eg. A-1, A-2, etc.). Moreover, the present day practice of radiologists is to reduce to a minimum size, "cone down," the X-ray beam being projected. Thus, any identification indicia at the edge of the film requiring X-ray energization are likely to be underexposed and unreadable. Another solution to the problem has been to provide a special and separate X-ray source for exposing the identifying symbols at the film's edge. However, this solution requires the purchase and operation of an extra X-ray machine. A completely different solution to the problem has been to tape an ID card to the cassette or stack of cassettes so that the processing technician can expose the X-ray film to the ID information or mark it on the film mechanically. Such a solution provides many opportunities for both human and mechanical errors.

Therefore, an object of the present invention is to provide a simple, reliable, and economical apparatus and method for placing identifying information on films within a closed cassette.

For use with the present invention, thin cassettes containing a sheet of film such as X-ray film are provided with an off-center slot along one edge. This slot is made light tight by some flexible media such as velvet, black sponge rubber, or the like, or by interlacing flexible flaps. In accordance with one embodiment of the present invention, a tongue of stiff material containing an electroluminescent panel lamp and an "ID" (identification) card having a patient's identification is inserted through this slot with the card being positioned between the lamp and the film in the cassette. The electroluminescent panel lamp is then energized for a short time, such as .3 seconds, to form on the film a latent image of the indicia on the identification card. After the rest of the film is exposed to X-rays and developed, it contains both the X-ray image and the ID information image positively identifying the patient. With a light source identification system such as this, it becomes feasible to have typed ID cards with a complete legend of the patient's full name, address, doctor, malady and date of radiograph. With this image on the radiograph, positive and unmistakable identification is assured.

The subject matter which is regarded as our invention is particularly pointed out and distinctly claimed in the concluding portion of this specification. The invention, however, as to its organization and operation, together with further objects and advantages, will best be understood by reference to the following description, taken in connection with the accompanying drawing, in which:

Figure 1:
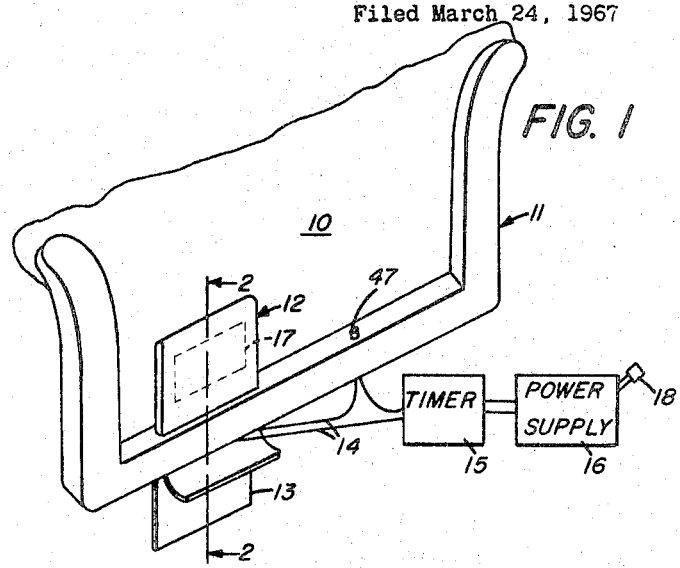
FIG. 1 is a perspective view of one embodiment of our invention.

Referring now to the drawing, wherein like numbers refer to similar parts we have shown in FIG. 1 a support surface 10 such as a wall or table top having secured thereto a bracket 11 which forms a base support member for a stiff tongue 12. The bracket 11 is of a width which will accommodate a film cassette and the tongue 12 is positioned therein off-center so that such a cassette may not be reversed in the bracket 11 while presenting its slot in a location which the tongue 12 can penetrate. This assures that the tongue, including an illuminating means, will be positioned to project data of an ID card 13 through a front window indicated at 17 (in dashed lines in FIG. 1) to form a latent image on a film in the film cassette.

The ID card 13 is one which accompanies the patient to be radiographed. Thus each ID card comes into the X-ray room only when the patient enters. It contains such information as the patient's name, address, doctor, "fractured rib" etc. The card 13 may be a simple common 3 x 5 pasteboard card of the type normally used in card files, or may be a transparent plastic card. In any case, a most practical manner of placing desired ID information thereon is by means of a typewriter or the like which develops relatively opaque characters to block the light of the illuminating system of the tongue 12.

Also indicated in FIG. 1 is a pair of wires 14 coupling the tongue 12 to a timer 15 and a power supply 16. If the identifying system is to be used before or after the radiograph is taken, when patient enters the X-ray room a technician inserts his ID card 13 in the tongue 12. When the cassette is pushed into engagement with the identification unit, and the tongue enters the cassette, the power supply 16 and the timer 15 are energized by means of a switch 18 to record an ID latent image on the film. With the light source so close to the film a very short period of illumination (less than 1 second) is sufficient to properly expose the film even when projecting the light through a relatively opaque 3 x 5 card. If the bracket 11 is located on the X-ray support system such as the table or vertical standard in an X-ray room, the tongue 12 may be energized by an auxiliary switch means during the period when the X-ray image itself is being established.

Figure 2:
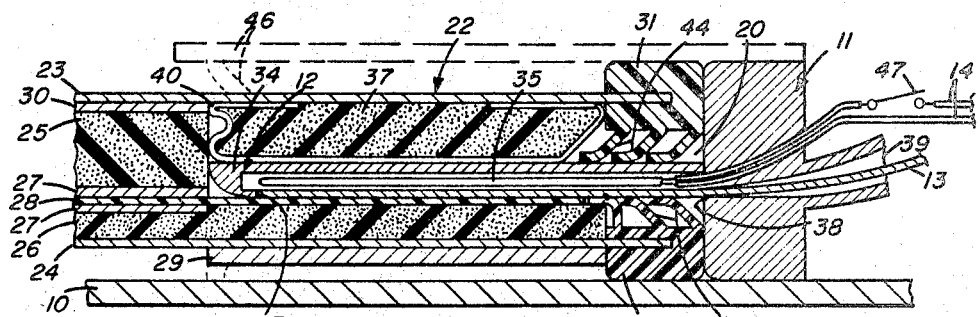
FIG. 2 is an enlarged sectional view taken along the line 2—2 of FIG. 1.

In FIG. 2 we have shown the ID card 13 inserted in the tongue 12 with the tongue in a slot 20 of a cassette 22. The cassette 22 is of a sandwich-like construction with metal outer plates or panels 23 and 24 having secured thereto resilient sponge layers 25 and 26 of a material such as polyether foam each supporting an intensifier screen 27 which is pressed against a film sheet 28. In a corner of the cassette selected for identification purposes the intensifying screens 27 may be omitted and a lead foil shield 29 is attached to the surface of panel 24 in front of the film 28 to prevent unwanted X-ray exposure or fogging of the identification area of the film 28. Usually a similar lead shield 30 is inserted at back of the cassette 22 to limit the backscatter of the X-rays. The slot 20 is a slim light tight opening defined by a portion of the frame members 31 and 32 of the cassette.

Referring now to one embodiment of our invention, the tongue 12 itself comprises a relatively stiff frame support member 34 of some material such as stainless steel in which is mounted an electroluminescent panel lamp 35. The panel lamp directs light energy toward the window 17 and may be of several commercially available types, which emit yellow, green, blue or white light. Each of these lamps produces a low level of infrared energy. If a particular lamp used emits a substantial amount of infrared energy, we prefer to use an infrared filter 36 (FIG. 3) to produce a "cold" light. This "cold" light is preferable because it provides a more uniform exposure of the commercially available X-ray films. Since usually the infrared sensitivity of X-ray film is not material to its effective use with X-rays, infrared sensitivity may vary widely from one brand of film to another. At the front surface region of the panel lamp 35 is the space or window 17 (indicated only by an edge in FIGS. 2 and 3) with the ID card 13 therein. For purposes of discussion this front portion will be referred to hereinafter as the front surface region of the tongue 12.

In view of the fact that the foam sponge 26 and a tapered foam pillow member 37 are compressed by the tongue, they in turn tightly engage the tongue 12 and its contents when inserted in the slot 20. Therefore, it is generally preferable to have the ID card 13 inserted into the front surface region of the tongue 12 before the tongue is inserted in the slot 20. The ID card 13 is inserted into tongue 12 through a thin slot 38 defined in the tongue base which is aligned with a tapered slot 39 extending through the bracket 11. The card 13 substantially fills the slot 38 and thereby minimizes any damaging light leakage therethrough.

Figure 3:
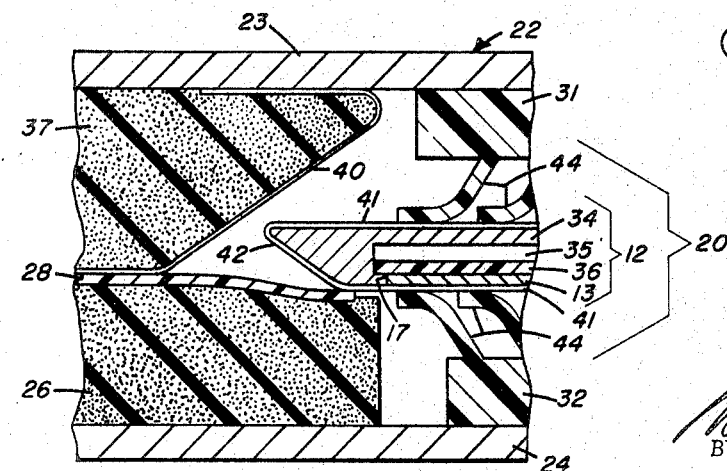
FIG. 3 is an enlarged view of a portion of the apparatus illustrated in the sectional view of FIG. 2.

Referring now to FIG. 3 the tapered foam pillow member 37 is shown in more detail as being wrapped in a slippery plastic sheet 40. Similarly, the tongue 12, at least the front surface region is covered in a slippery and transparent plastic sheet 41 for facilitating its being inserted into the slot 20 many times without damage to the film 28 or to the foam pillow 37. When the slippery sheet 41 is provided in front of the tongue, it will protect the film 28 so that the card 13 may be inserted after the tongue 12 is in the cassette. This technique is most practical if the slot 38 is provided with a light leak inhibitor such as a dull paint or a soft black velvet plush surface. The leading tip surface 42 of the tongue 12 is tapered to deflect the film 28 toward the front surface region of the tongue. Then the film is exposed when the ID data is illuminated by the lamp 35, after tongue insertion is completed, as shown in FIG. 2.

In order that unwanted illumination of the film 28 be prevented, we prefer to provide the foam 26 with a black surface adjacent to the tongue front surface region. This prevents reflection or "back scattering" of light to blur the image on the film 28. Also, the slot 20 is provided with several interlocking, resilient, light-blocking flaps 44. The flaps 44 may be of a relatively simple construction, if the region of the tongue is partially enclosed by a light baffle as indicated in phantom at 46 (FIG. 2). A position contact switch 47 allows energization of the panel lamp 35 only when the frame members 31 of the cassette 22 are in position against the bracket 11.

Figure 4:
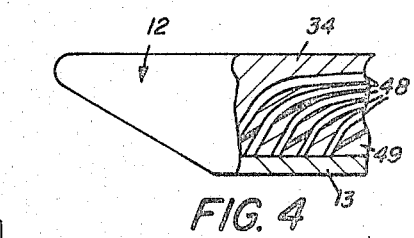
FIG. 4 is a partial sectional view of another tongue construction.

In FIG. 4 we have shown another embodiment of the tongue 12 wherein the stiff frame 34 supports light directing fibers 48 of a fiber optical system which is illuminated by means such as a lamp and shutter in the base 11. Also, certain simple prism systems within the tongue 12 may be used to direct light from a lamp in the base 11 against the card 13. The fibers 48 are closely packed in the tongue 12 near the base 11, but are distributed over the used region of the window 17 to illuminate a substantial portion of the entire ID signal area. Preferably the distributed fibers 48 are secured by potting plastic 49 or the like.

We have shown this invention directed primarily toward a simple and reliable system for recording on an X-ray film sufficient data to provide unmistakable identification. With this economical and easy to use radiographic ID system we expect to avoid the mixup problem that can cause either a waste of time or a misdiagnosis with potentially tragic results.

The invention has been described in detail with particular reference to preferred embodiments thereof, but it will be understood that variations and modifications can be effected within the spirit and scope of the invention as described hereinabove and as defined in the appended claims.

We claim:

1. A device for photographically imprinting identification information on a portion of a film in a cassette, said cassette having a slot along a portion of one edge for receiving a tongue member, said device comprising:
   a relatively flat, stiff support tongue member insertable into the slot, during such insertion said member cooperating with the slot to position a front surface region thereof parallel to a surface of such portion of any film therein, said member defining a window adjacent to the front surface region;
   illuminating means within and supported by said member for directing light toward the window;
   bracket means for supporting said member so that said member projects therefrom, said bracket means having a card slot therein for receiving a card having identification information thereon, said card slot being positioned to facilitate insertion of said card therethrough to a position between said light directing means and the window; and
   circuit means for energizing said light illuminating means for a period sufficient to expose such portion of film with the information on the card.

2. For use with a closed sheet film cassette having a slot along a portion of one edge for receiving a card having identification information thereon, a laminated device adapted for insertion into said slot for photographically imprinting the identification information on said card onto a portion of the film in the cassette, said device comprising:
   a relatively flat, stiff support member for facilitating insertion of the card into the slot of the cassette, said support member defining a front surface region opposite a film sheet in said cassette;
   an electroluminescent panel lamp within said member and supported by said member positioned to direct light through the card toward the front surface region; and
   circuit means for energizing said lamp for a period sufficient to expose a film with information of the card.

3. The invention according to claim 2 and further comprising:
   a light transmissive sheet covering the front surface region and spaced from said panel lamp with the space therebetween for receiving the card so that an image of the information thereon is projectable through said sheet.

4. The invention according to claim 2 and further comprising:
said electroluminescent panel lamp producing a very small portion of infrared light whereby the card is illuminated with "cold" light.

5. The invention according to claim 2 and further comprising:
a base defining a slot for receiving the card and guiding it to a position between said lamp and the front surface region of the tongue.

6. An unmistakable identification apparatus usable with X-ray film cassettes, comprising:
a bracket adapted to receive one edge of the cassette; and
a tongue protruding from said bracket in a manner to be insertable in a slot of the cassette, said tongue being positioned relative to said bracket to match the slot of the cassette so that a front surface region of said tongue will be adjacent to any film in the cassette, said tongue comprising;
a stiff support frame member having a leading edge,
an electroluminescent panel lamp positioned to direct light toward the front surface region, and
guide means for receiving an ID card and directing it between said lamp and the front surface region.

7. The invention of claim 6 and further comprising:
a leading edge of said stiff frame member being fashioned to deflect any film in the cassette to lie adjacent to the front surface region.

8. The invention of claim 6 and further comprising:
a slippery covering positioned over the front surface region to facilitate sliding the tongue over any film in the cassette without damage thereof.

9. A device for recording identification information of an ID card on a film located in a closed cassette having an opening for receiving an information bearing member which includes such an ID card, comprising:
an information bearing member which can be brought through the opening into cooperative contact with the film; and
illuminating means within said member for illuminating the ID card so that a light image of the information thereof is recorded on the contacted film.

10. A device for recording identification information on a film located in a cassette having a slot for receiving an information bearing member, comprising:
an information bearing member having a relative flat surface and being insertable into such cassette through the slot therein to a position wherein said surface is, adjacent to such film, said member defining a window in said relatively flat surface from which such identification information is recorded on the adjacent film; and
illuminating means within said member for supplying a light image of such identification information through said window.

11. The invention in accordance with claim 10 wherein:
said illuminating means comprises an electroluminescent panel lamp supported by said member adjacent to the window for supplying upon energization a "cold" light image of the identification information through the window onto the film.

12. A method for exposing identification information on a portion of a film within a cassette having a slot for receiving an information bearing member comprising the steps of:
placing outside of the cassette a card having identification information in front of an illuminating device to form an information bearing member;
positioning said information bearing member into said cassette through the slot with the card superposed over said portion of the film;
energizing said device to produce sufficient illumination through said card to expose said portion of the film with the identification information on the card.

13. A method for exposing films as in claim 12 and further comprising:
withdrawing said card and said device without further exposing the film.

References Cited

UNITED STATES PATENTS

| | | | |
|---|---|---|---|
| 2,505,562 | 4/1950 | Meschan | 250—67 |
| 2,837,658 | 6/1958 | Limbach | 250—67 |
| 3,096,458 | 7/1963 | Demmy | 240—2.25 XR |
| 3,386,355 | 6/1968 | Erikson | 95—1.1 |

NORTON ANSHER, Primary Examiner

LEO H. McCORMICK, Jr., Assistant Examiner

U.S. Cl. X.R.

95—1.1